(12) United States Patent  
Maamari et al.

(10) Patent No.: US 12,543,199 B2
(45) Date of Patent: Feb. 3, 2026

(54) WIRELESS COMMUNICATION SCHEDULING

(71) Applicant: QUALCOMM Incorporated, San Diego, CA (US)

(72) Inventors: Diana Maamari, San Diego, CA (US); Ahmed Elshafie, San Diego, CA (US); Mickael Mondet, Louannec (FR); Prashanth Haridas Hande, San Diego, CA (US); Huilin Xu, Temecula, CA (US); Wei Yang, San Diego, CA (US); Hyun Yong Lee, San Diego, CA (US); Ovidiu Constantin Iacoboaiea, Chatillon (FR)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 18/047,224

(22) Filed: Oct. 17, 2022

(65) Prior Publication Data

US 2024/0129940 A1 Apr. 18, 2024

(51) Int. Cl.
*H04W 72/52* (2023.01)
*H04W 28/02* (2009.01)

(52) U.S. Cl.
CPC ....... *H04W 72/52* (2023.01); *H04W 28/0278* (2013.01)

(58) Field of Classification Search
CPC .............. H04W 72/52; H04W 28/0278
See application file for complete search history.

(56) References Cited

U.S. PATENT DOCUMENTS

| | | | |
|---|---|---|---|
| 11,297,553 B1 * | 4/2022 | Marupaduga | H04W 36/34 |
| 11,528,727 B2 * | 12/2022 | Jeon | H04L 5/0044 |
| 11,558,886 B2 * | 1/2023 | Zhang | H04W 72/23 |
| 12,133,224 B2 * | 10/2024 | Hofström | H04W 28/0278 |
| 2009/0113086 A1 * | 4/2009 | Wu | H04W 72/21 |
| | | | 710/56 |
| 2018/0279150 A1 * | 9/2018 | He | H04W 72/23 |
| 2019/0059096 A1 * | 2/2019 | Wang | H04L 5/0053 |
| 2019/0110224 A1 * | 4/2019 | Yasukawa | H04W 72/21 |
| 2020/0037199 A1 * | 1/2020 | Wang | H04W 72/569 |
| 2021/0168841 A1 * | 6/2021 | Vankayala | H04W 72/21 |
| 2021/0176661 A1 * | 6/2021 | Kim | H04W 28/0278 |

(Continued)

OTHER PUBLICATIONS

International Search Report and Written Opinion—PCT/US2023/075774—ISA/EPO—Jan. 3, 2024.

(Continued)

*Primary Examiner* — Christopher M Crutchfield
*Assistant Examiner* — Tito Q Pham
(74) *Attorney, Agent, or Firm* — ArentFox Schiff, LLP

(57) ABSTRACT

Aspects of the disclosure are directed to an apparatus configured for wireless communication. In certain aspects, the apparatus is configured to generate data (e.g., generate uplink data and store the data in a buffer until uplink resources are granted for transmission of the data). In certain aspects, the apparatus is configured to transmit, to a network node, a scheduling request (SR) comprising an indication of a size of the generated data, wherein the indication of the size of the generated data is configured to indicate whether the size of the generated data is greater than or equal to a threshold value, or less than or equal to the threshold value.

16 Claims, 17 Drawing Sheets

(56) References Cited

U.S. PATENT DOCUMENTS

2021/0212086 A1* 7/2021 Li .......................... H04L 1/1812
2022/0377602 A1* 11/2022 Kim ....................... H04W 28/06
2024/0244480 A1* 7/2024 Tano ...................... H04W 72/21

OTHER PUBLICATIONS

Moderator (Ericsson): "Moderator Summary#1—Study on XR Specific Capacity Improvements", 3GPP TSG-RAN WG1 Meeting #110bis-e, R1-2210410, 3rd Generation Partnership Project, Mobile Competence Centre, 650, Route Des Lucioles, F-06921 Sophia-Antipolis Cedex, France vol. RAN WG1, No. E -meeting, Oct. 10, 2022-Oct. 19, 2022, Oct. 12, 2022, 142 Pages, XP052259877, paragraph [0094]-paragraph [0096].

Qualcomm Incorporated: "Enhanced SR and BSR", 3GPP TSG-RAN WG2 Meeting #97bis, R2-1703887, 3rd Generation Partnership Project, Mobile Competence Centre, 650, Route Des Lucioles, F-06921 Sophia-Antipolis Cedex, France, vol. RAN WG2, No. Spoken, USA, Apr. 3, 2017-Apr. 7, 2017, Apr. 5, 2017, pp. 1-3, XP051254737, subclause 2.1 Enhanced SR/BSR for eMBB.

TCL Communication: "Discussion on XR Specific Capacity Enhancement Techniques", 3GPP TSG RAN WG1 #110bis-e, R1-2209000, 3rd Generation Partnership Project, Mobile Competence Centre, 650, Route Des Lucioles, F-06921 Sophia-Antipolis Cedex, France, vol. RAN WG1, No. E-meeting, Oct. 10, 2022-Oct. 19, 2022, Sep. 30, 2022, 6 Pages, XP052276919, subclause 2.2 Dynamic scheduling/grant enhancement.

* cited by examiner

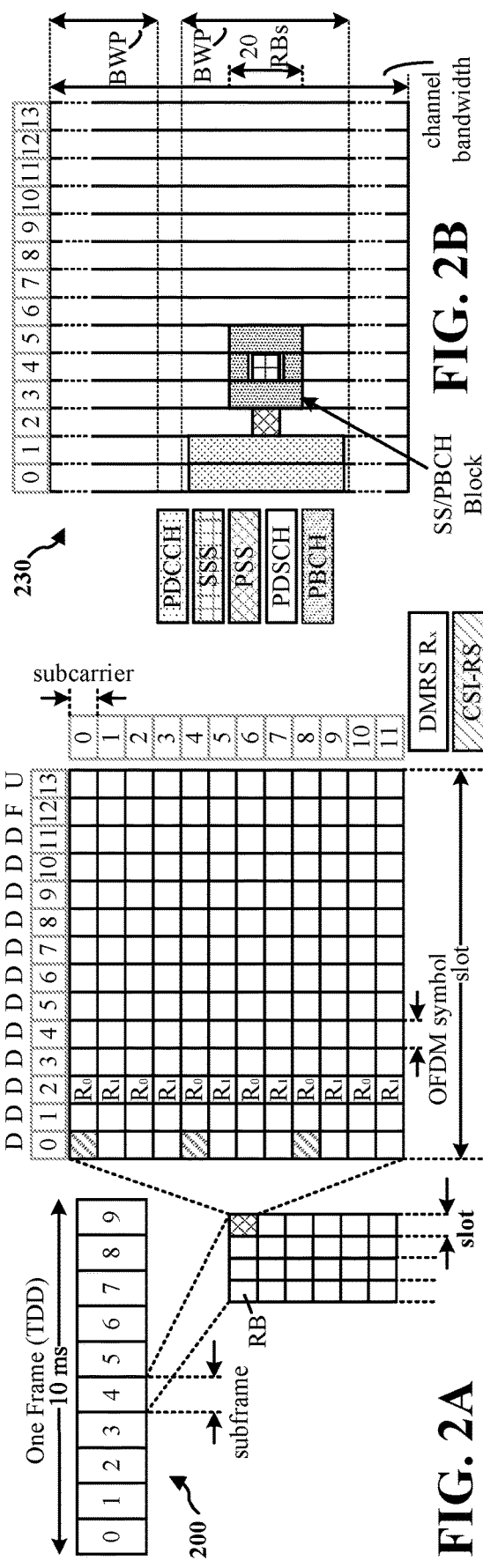
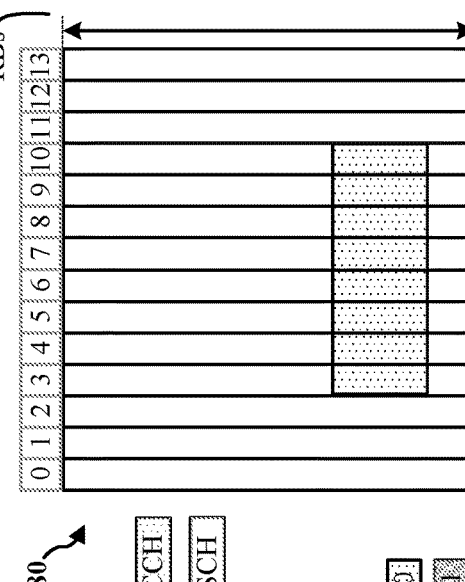
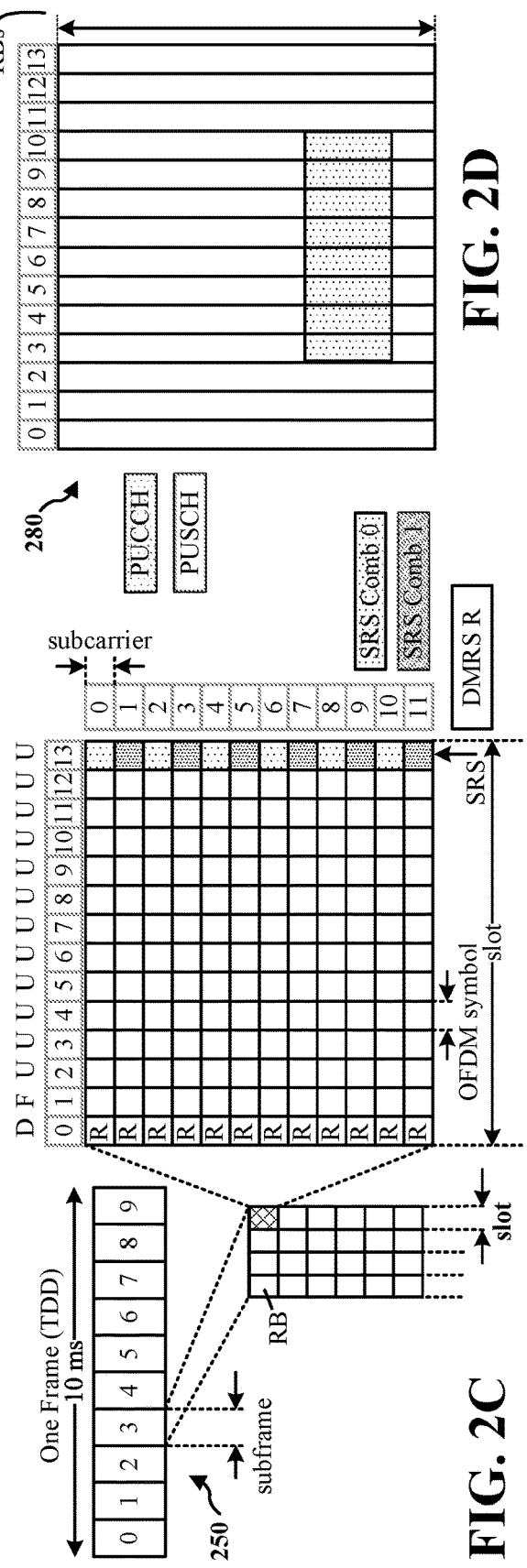
FIG. 2A  FIG. 2B  FIG. 2C  FIG. 2D

| HARQ-ACK Value | {0, 0} | {0, 1} | {1, 1} | {1, 0} |
|---|---|---|---|---|
| Sequence Cyclic Shift | 0 | 3 | 6 | 9 |

WIRELESS COMMUNICATION SCHEDULING

BACKGROUND

Technical Field

The present disclosure generally relates to communication systems, and more particularly, to methods and techniques for uplink scheduling in a wireless network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to a method for wireless communication at an apparatus. In some examples, the method includes generating data. In some examples, the method includes outputting, for transmission to a network node, a scheduling request (SR) comprising an indication of a size of the generated data, wherein the indication of the size of the generated data is configured to indicate whether the size of the generated data is greater than or equal to a threshold value, or less than or equal to the threshold value.

Certain aspects are directed to a method for wireless communication at an apparatus. The method may include generating data. In some examples, the method includes outputting, for transmission to a network node, a communication comprising a scheduling request (SR) and an indication of a size of the generated data, wherein the indication of the size of the generated data is configured to indicate whether the size of the generated data is greater than or equal to a threshold value, or less than or equal to the threshold value.

Certain aspects are directed to an apparatus configured for wireless communication, comprising: a memory comprising instructions and one or more processors configured to execute the instructions. In some examples, the one or more processors are configured to generate data. In some examples, the one or more processors are configured to output, for transmission to a network node, a scheduling request (SR) comprising an indication of a size of the generated data, wherein the indication of the size of the generated data is configured to indicate whether the size of the generated data is greater than or equal to a threshold value, or less than or equal to the threshold value.

Certain aspects are directed to an apparatus configured for wireless communication, comprising: a memory comprising instructions and one or more processors configured to execute the instructions. In some examples, the one or more processors are configured to generate data. In some examples, the one or more processors are configured to output, for transmission to a network node, a communication comprising a scheduling request (SR) and an indication of a size of the generated data, wherein the indication of the size of the generated data is configured to indicate whether the size of the generated data is greater than or equal to a threshold value, or less than or equal to the threshold value.

Certain aspects are directed to an apparatus for wireless communication. In some examples, the apparatus includes means for generating data. In some examples, the apparatus includes means for outputting, for transmission to a network node, a scheduling request (SR) comprising an indication of a size of the generated data, wherein the indication of the size of the generated data is configured to indicate whether the size of the generated data is greater than or equal to a threshold value, or less than or equal to the threshold value.

Certain aspects are directed to an apparatus for wireless communication. The apparatus may include means for generating data. In some examples, the apparatus includes means for outputting, for transmission to a network node, a communication comprising a scheduling request (SR) and an indication of a size of the generated data, wherein the indication of the size of the generated data is configured to indicate whether the size of the generated data is greater than or equal to a threshold value, or less than or equal to the threshold value.

Certain aspects are directed to a non-transitory computer-readable medium comprising instructions that, when executed by an apparatus, cause the apparatus to perform a method. In some examples, the method includes generating data. In some examples, the method includes outputting, for transmission to a network node, a scheduling request (SR) comprising an indication of a size of the generated data, wherein the indication of the size of the generated data is configured to indicate whether the size of the generated data is greater than or equal to a threshold value, or less than or equal to the threshold value.

Certain aspects are directed to a non-transitory computer-readable medium comprising instructions that, when executed by an apparatus, cause the apparatus to perform a method. The method may include generating data. In some examples, the method includes outputting, for transmission to a network node, a communication comprising a scheduling request (SR) and an indication of a size of the generated data, wherein the indication of the size of the generated data is configured to indicate whether the size of the generated data is greater than or equal to a threshold value, or less than or equal to the threshold value.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
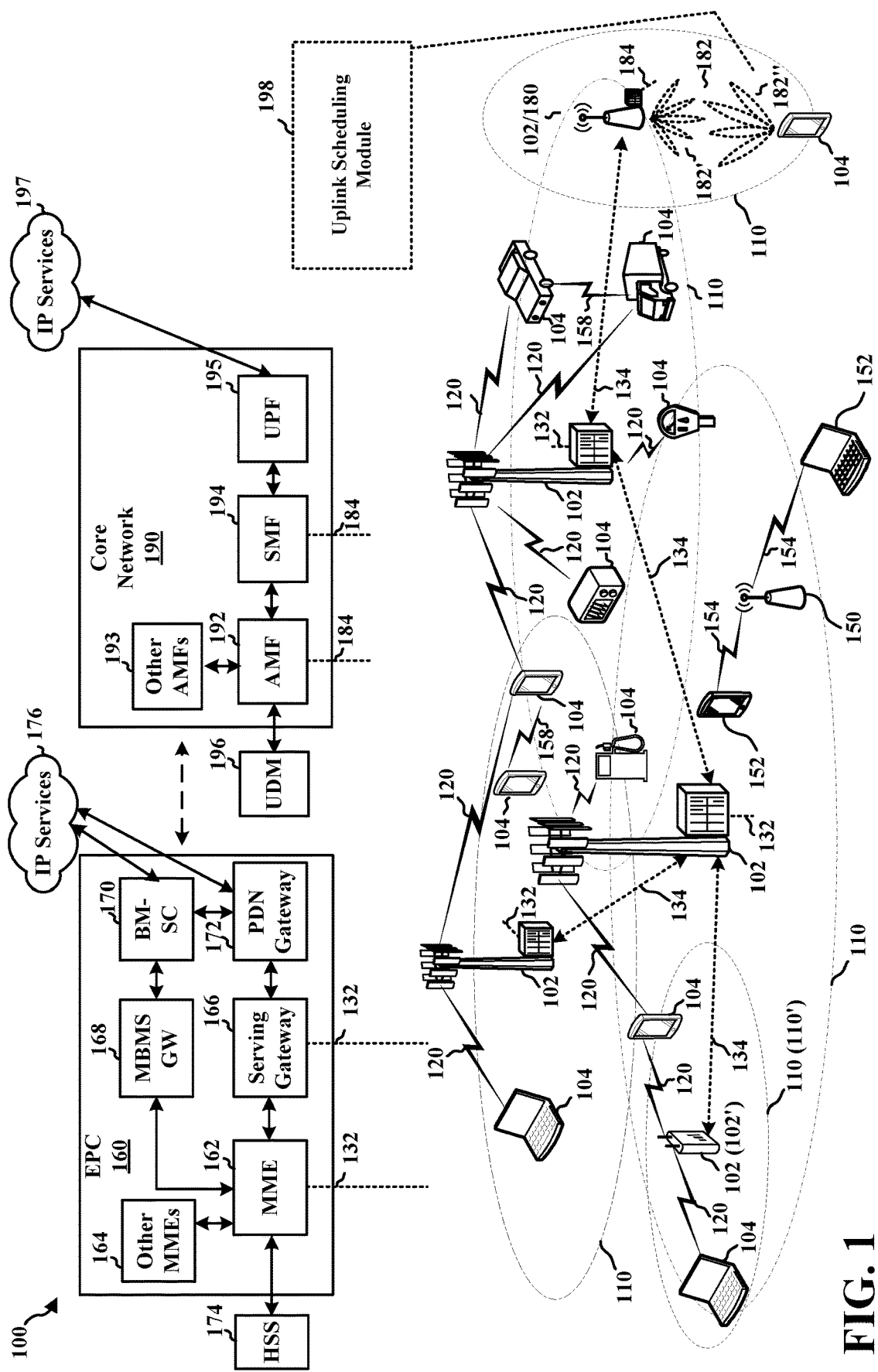
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In order to transmit uplink data to a network node in a conventional wireless communication, a user equipment (UE) may be required to wait for an uplink slot to transmit a positive scheduling request (SR) (e.g., via physical uplink communication channel (PUCCH)) to the network node. The UE then waits for next uplink slot to transmit a buffer status report (BSR) to the network node, and then waits for a next uplink slot to be scheduled, according to the BSR, to transmit the uplink data. Such a procedure, if performed in a downlink-downlink-downlink-downlink-uplink (DDDDU) communications configuration, may result in an uplink data transmission delay of at least 10 milliseconds (ms) at 15 kHz sub-carrier spacing (SCS). For low latency applications (e.g., extended reality (XR) and the like), this delay can be problematic given the tight delay budgets associated with such applications.

A "positive SR" is an SR that is transmitted by a UE and comprises at least one bit (e.g., a 1 or a 0) indicating that the UE has data for an uplink transmission stored in its buffer. In contrast, a "negative SR" is one where the UE transmits nothing (e.g., the UE has no data for an uplink transmission). Aspects of the disclosure are directed to enhanced SR and/or BSR communications configured to rapidly provide uplink grants to a UE, thereby reducing the amount of time required for obtaining an uplink grant. Certain aspects are directed to SR communication enhancements to reduce or eliminate a need for a separate BSR communication. Certain aspects provide methods and techniques for providing BSR on SR resources and multiplexing between SR and initial BSR indications.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., 51 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include an uplink scheduling module 198 configured to generate data and output, for transmission to a network node, a scheduling request (SR) comprising an indication of a size of the generated data, wherein the indication of the size of the generated data is configured to indicate whether the size of the generated data is greater than or equal to a threshold value, or less than or equal to the threshold value.

In some examples, the uplink scheduling module 198 may be configured to generate data and output, for transmission to a network node, a communication comprising a scheduling request (SR) and an indication of a size of the generated data, wherein the indication of the size of the generated data is configured to indicate whether the size of the generated data is greater than or equal to a threshold value, or less than or equal to the threshold value.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and $2^\mu$ slots/subframe. The subcarrier spacing and symbol length/duration are a function of the numerology. The subcarrier spacing may be equal to $2^\mu*15$ kilohertz (kHz), where µ is the numerology 0 to 4. As such, the numerology 1.1=0 has a subcarrier spacing of 15 kHz and the numerology µ=4 has a subcarrier spacing of 240 kHz. The symbol length/duration is inversely related to the subcarrier spacing. FIGS. 2A-2D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
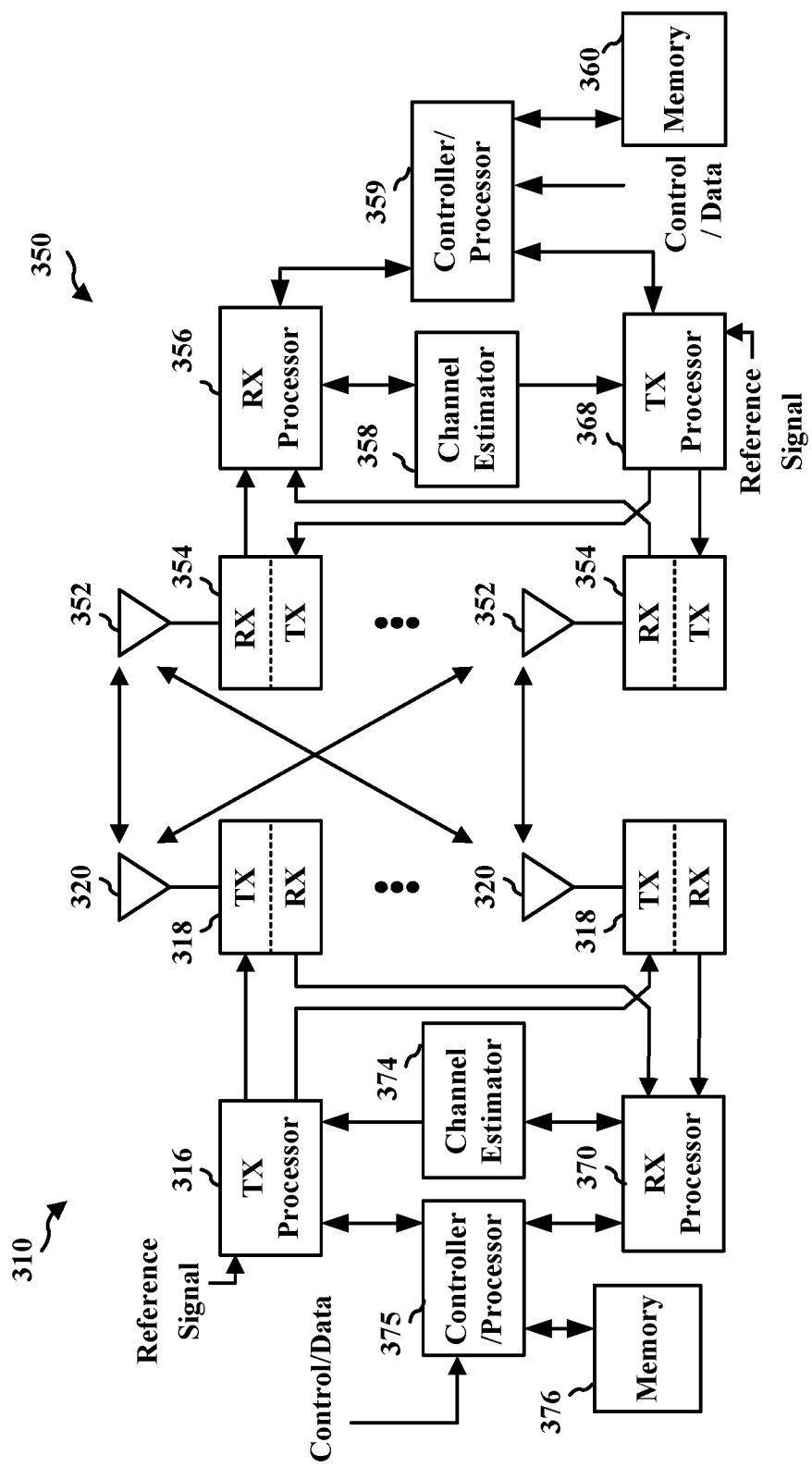
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
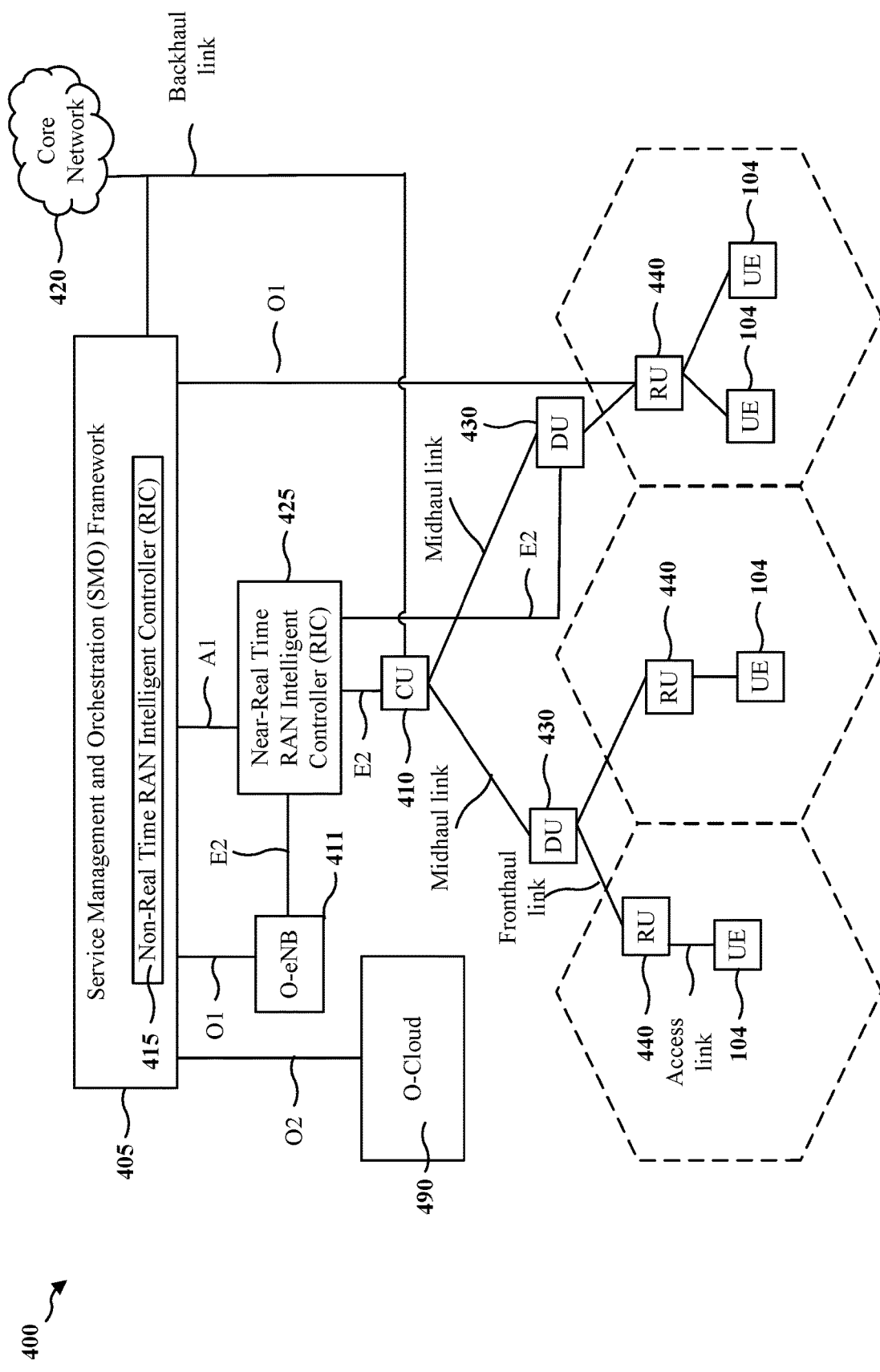
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440.

Each of the units, i.e., the CUs 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit—user plane (CU-UP)), control plane functionality (i.e., central unit—control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud 490) 652) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425.

The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

At least one of the TX processor 368, the RX processor 356, and the controller/processor 359 may be configured to perform aspects in connection with 198 of FIG. 1.

Figure 5:
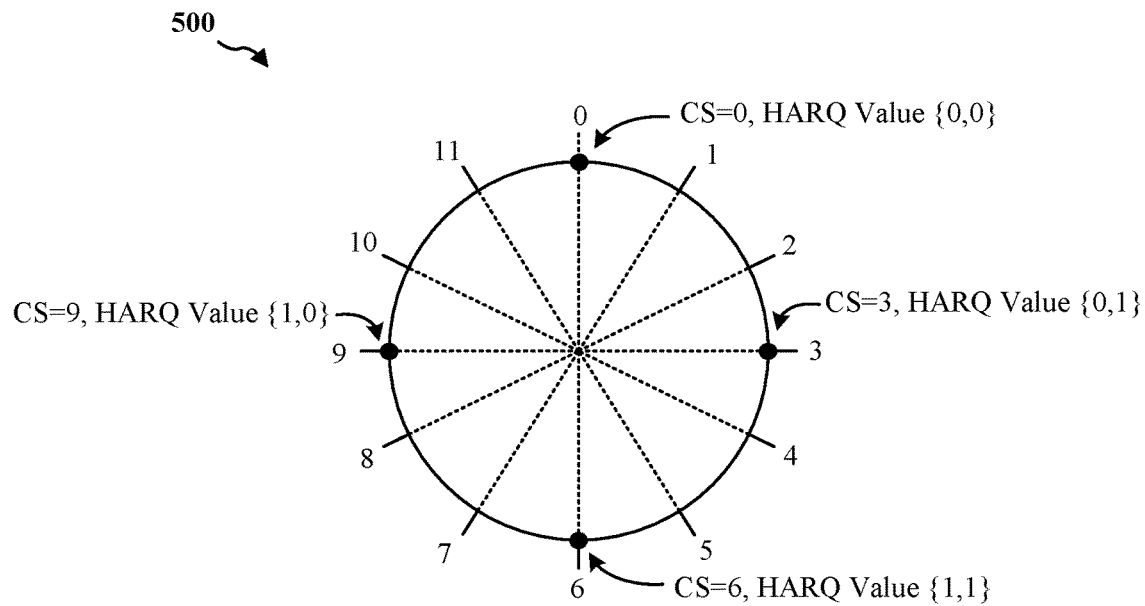
FIG. 5 is a schematic diagram illustrating the available cyclic shifts (CS) (in the time domain) for a sequence (e.g., Zadoff-Chu (ZC)) of length 12 symbols.

FIG. 5 is a schematic diagram 500 illustrating the available cyclic shifts (CS) (in the time domain) for a sequence (e.g., Zadoff-Chu (ZC)) of length 12 symbols. It is noted that orthogonality between different code channels varies widely; the best orthogonality is achieved between the code channels which have the largest difference in cyclic shift domain (e.g., cyclic shift #0 and cyclic shift #6 of FIG. 5).

In some aspects of wireless communication, two UEs (e.g., UE 104 of FIG. 1) at different channel conditions may be assigned to the same physical (e.g., time/frequency) resources and their transmissions can be decoded in the by a network node (e.g., network node 102/180 of FIG. 1) due to those different channel conditions (e.g., different physical locations). The 'same' resources may be overlapping rather than identical. In order to differentiate multiplexed UEs sharing the same physical resource at the receiver side, there should be low enough cross-correlation between the reference signals. This can be arranged by allocating a different cyclic shift of the same reference signal for different MU-MIMO terminals. In this case, signaling of the cyclic shift can be done using dynamic channel state information (CSI) included in the UL grant.

In some examples, a UE may transmit a 2-bit HARQ ACK (e.g., PUCCH format 0) by transmitting a base sequence S with a certain amount of cyclic shift. The amount of cyclic shift may depend on the HARQ bits. For example, one or more cyclic shift values may be mapped to the 2-bit HARQ values. In some examples, a first bit may correspond to an SR, and a second bit may correspond to an indication of the size of an uplink data transmission (e.g., an amount of data stored in a UE buffer). As illustrated, a HARQ ACK value of {0,0} maps to a cyclic shift of 0, a HARQ ACK value of {0,1} maps to a cyclic shift of 3, a HARQ ACK value of {1,1} maps to a cyclic shift of 6, and a HARQ ACK value of {1,0} maps to a cyclic shift of 9. These are examples, and as shown below, other mapping schemes are contemplated. Examples of a Multi-Function Scheduling Request (SR)

If a UE (e.g., UE 104 of FIG. 1) has data for an uplink transmission, it may transmit an SR to a network node (e.g., base station 102/180 of FIG. 1) to request an uplink grant. When the SR is not multiplexed with a HARQ ACK, then the UE 104 may transmit a 1-bit SR (e.g., a 0 or a 1). Alternatively, if the UE 104 has no data, the UE 104 will refrain from transmitting any SR. That is, the UE 104 may utilize the SR to inform a network node that the UE 104 has data for an uplink transmission to the node and request an uplink grant.

Figure 6:
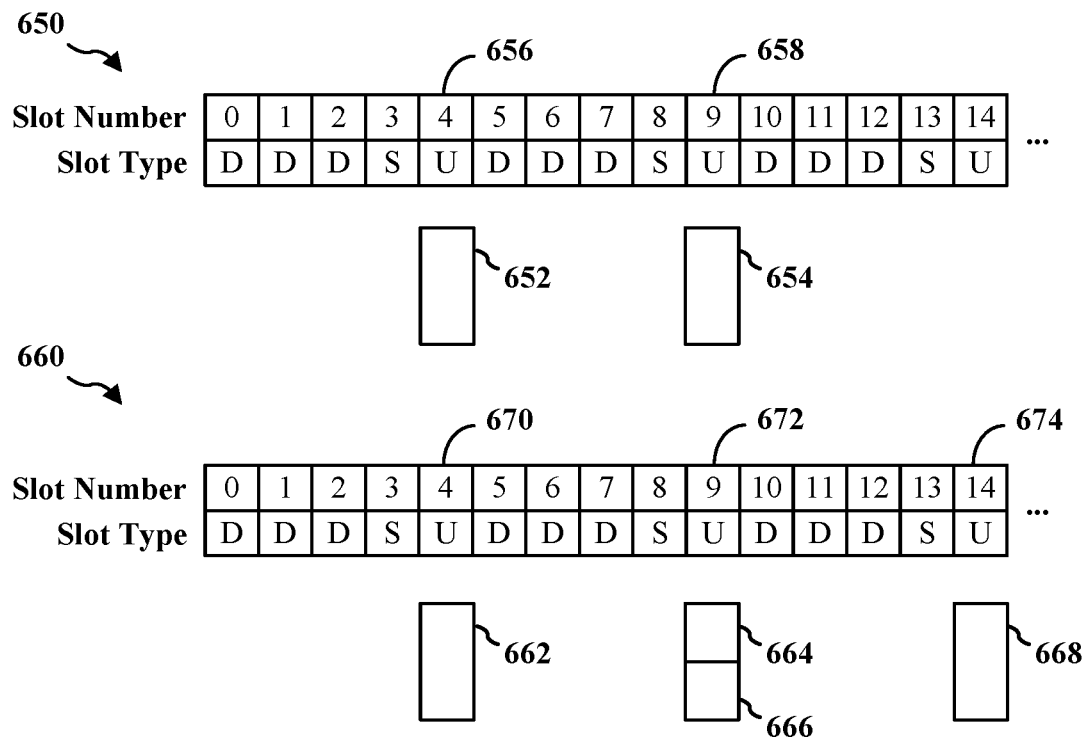
FIG. 6 is a schematic diagram illustrating two example slot configurations and example SR and BSR communications.

In certain aspects, the UE 104 may use the SR to provide the network node 102 with additional information, including information about the buffer status of the UE 104. FIG. 6 is a schematic diagram illustrating two example slot configurations 650/660 and example SR and BSR communications. Although both slot configurations are an example of a downlink-downlink-downlink-special-uplink (DDDSU) slot configuration, any suitable configuration is contemplated.

The first example slot configuration 650 illustrates a first stage BSR transmission, wherein an SR 652 transmitted within a first uplink slot 656 is configured to provide the network node 102 with an indication of the buffer status of the UE 104. Here, the SR 652 comprises a 1-bit value (e.g., a value 0 or a value 1). A "value 0" may be configured to indicate to the network node 102 that the UE 104 is requesting an uplink grant (e.g., the UE 104 has data for uplink transmission) and the amount of uplink data stored in the UE's buffer (e.g., a BSR value) is less than a threshold BSR value. A "value 1" may be configured to indicate that the UE 104 is requesting an uplink grant and the BSR value is greater than the threshold BSR value. In this example, it should be noted that if no SR is transmitted, then the UE 104 is not requesting an uplink grant (e.g., the UE 104 has no data for uplink transmission).

If the transmitted SR 652 is value=0, then the network node 102 may proceed to assign uplink resources to the UE 104 via uplink grant without the need for the UE 104 to transmit a BSR report. For example, if the threshold BSR value is equivalent to 1 slot, then the network node may provide the UE with the necessary uplink resources so that it can transmit uplink data 654 at the next uplink slot 658. In this manner, latency is reduced by eliminating the need to the UE 104 to transmit a separate BSR to the network node prior to transmitting the uplink data.

The second example slot configuration 660 illustrates an example scenario where the transmitted SR 662 is value=1 and transmitted in a first uplink slot 670. In this example, the network node 102 may assign uplink resources (e.g., the next uplink slot 672) to the UE 104 via a partial uplink grant. For example, the network node 102 may provide the UE 104 with an uplink grant assigning a portion of the next uplink slot 672 for uplink data 666 transmission. The UE 104 may also transmit, in the same uplink slot as the partial uplink grant, a partial BSR 664 configured to indicate an amount of resources required to transmit the remaining uplink data (e.g., the amount of uplink data stored in the buffer minus the amount of uplink data 666 transmitted in the next uplink slot 672). The network node may then provide the UE 104 with another uplink grant for transmission of the remaining uplink data 668 at the following uplink slot 674. In this manner, fewer bits are required to transmit the BSR 664 relative to a legacy BSR because the SR 662 includes information about the buffer status.

The threshold BSR value may be configurable by the network node 102 or UE 104. For example, the network node 102 or UE 104 may configure the threshold using L3/L2/L1 signaling (e.g., radio resource control (RRC) messaging, MAC-CE, DCI, or a piggyback signal on PDSCH/PDCCH).

Figure 7:
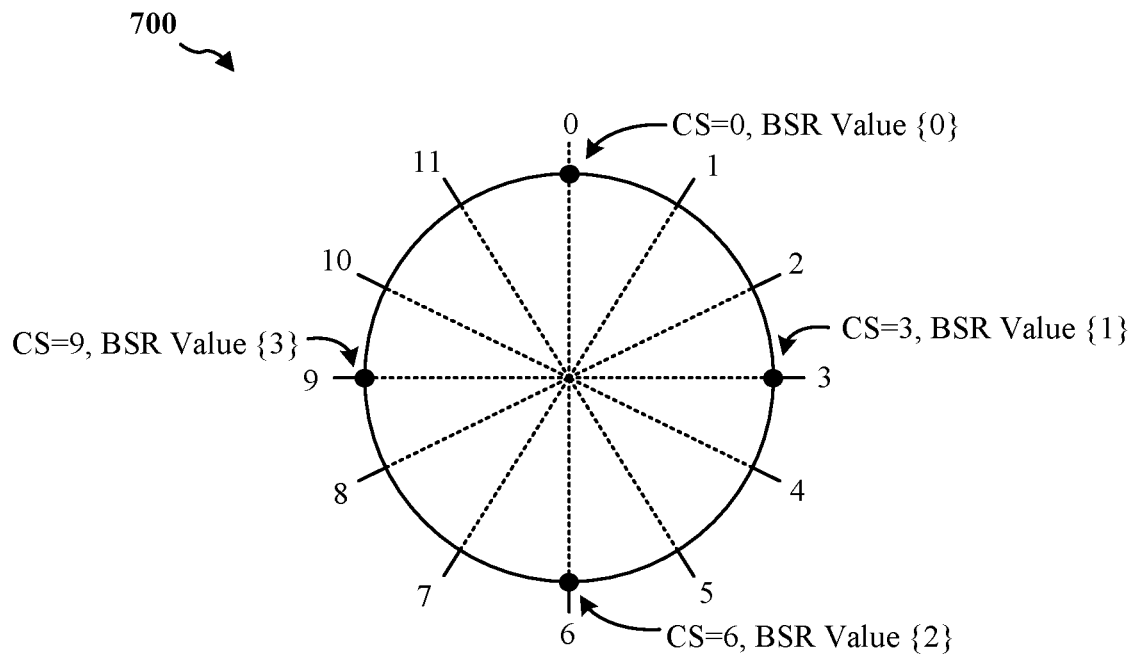
FIG. 7 is a schematic diagram illustrating an example mapping between and a coarse BSR range of values and a cyclic shift value.

FIG. 7 is a schematic diagram 700 illustrating an example mapping between and a coarse BSR range of values and a cyclic shift value. As illustrated, a cyclic shift may be any value from 0 to 11, wherein 0, 3, 6, and 9 are each mapped to a BSR range of values. That is, if the UE has M bits of data stored in a buffer for uplink transmission, the UE may transmit a PUCCH using a cyclic shift value indicative of a range of values that include M. Because there are four cyclic shift values, the range of values associated with each cyclic shift provides greater granularity relative to a 1-bit SR value.

Thus, when the UE transmits a PUCCH using a particular cyclic shift, the base station may receive the base sequence of the PUCCH, determine the cyclic shift, and map that shift to a BSR range. As illustrated, a cyclic shift of 0 is mapped to a range of 1 to X bits of uplink data; a cyclic shift of 3 is mapped to X+1 to Y bits of uplink data; a cyclic shift of 6 is mapped to Y+1 to Z bits of uplink data; and a cyclic shift of 9 is mapped to more than Z bits of uplink data.

In certain aspects, a HARQ ACK transmission may overlap with SR transmission, potentially resulting in a collision of the ACK and SR signals. In this scenario, the UE and base station may be configured to alter the meaning of SR values. Here, when the ACK overlaps with the SR, an SR value of 1 may be changed to mean that the UE has uplink data to transmit, and an SR value of 0 may be changed to mean that the UE has no uplink data to transmit.

Examples of a Scheduling Requests (SRs) and Buffer Status Requests (BSRs)

As discussed, a UE and base station may be configured to transmit and receive SR and/or BSR that allow the base station to configure and schedule uplink grants to UE quickly relative to examples where the base station is required to wait for a full BSR. Conventionally, the UE may send nothing when it has no data or has no high priority data to transmit. Thus, to enhance reliability, a UE may transmit a "0" value SR if the UE has no uplink data to transmit, and may transmit a "1" value SR when the UE has uplink data to transmit to the base station.

In some examples, a cyclic shift may indicate a particular HARQ ACK value. For example, as illustrated in FIG. 5, a cyclic shift of 0 may correspond (e.g., map) to a 2-bit HARQ ACK value of {0, 0}, etc. As discussed below, the cyclic shift may also (or alternatively) be used to indicate a particular RS and BSR value.

Figure 8:
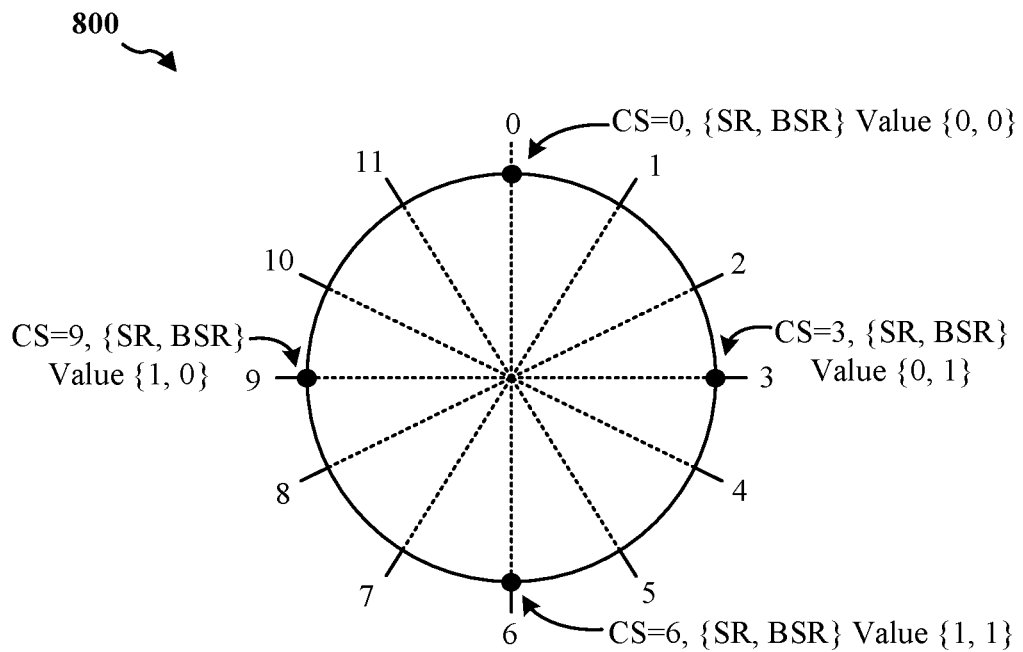
FIG. 8 is a schematic diagram illustrating an example mapping between and SR and BSR values and a cyclic shift value.

FIG. 8 is a schematic diagram 800 illustrating an example mapping between and SR and BSR values and a cyclic shift value. As illustrated, a cyclic shift may be any value from 0 to 11, wherein 0, 3, 6, and 9 are each mapped to SR and BSR values. That is, a UE may transmit a PUCCH using a cyclic shift value indicative of an SR value and a BSR value. It should be noted that the UE may not use a cyclic shift=3 because with a BSR=1 (e.g., indicating that the UE has an amount within a range of uplink data in the buffer) may not be rational with an SR=0 (e.g., indicating that the UE has no uplink data to transmit). The PUCCH may not be a HARQ ACK. Table 1 below illustrates an example code point for the SR and BSR values.

TABLE 1

| Codepoint (SR, BSR) | Meaning |
|---|---|
| 00 | No data or no new high priority data, and No BSR |
| 01 | Invalid |
| 10 | New data or new high priority data, and BSR < threshold value |
| 11 | New data or new high priority data, and BSR > threshold value |

In a first example, for a one symbol PUCCH format 0, the UE may multiplex the SR and BSR bits before encoding and transmit the PUCCH using a joint cyclic shift. That is, the PUCCH may be transmitted using one cyclic shift value to indicate both of the SR and BSR values, as illustrated in FIG. 8.

In a second example, instead of using the joint cyclic shift, the UE may transmit two separate signals: one signal for the SR bit, and another signal for the BSR bit. Here, the UE may transmit the SR bit at a different power level than the BSR bit to separate the two signals. For example, the SR may be transmitted at a higher power level than the BSR so that the base station can separate the two values.

In a third example, the UE may indicate to the base station whether there is new high priority data based on whether the UE transmits an SR at all. For example, instead of transmitting SR=0 to indicate that there is no new uplink data, the UE may instead refrain from transmitting an SR. For example, Table 2 below illustrates such an example.

TABLE 2

| Codepoint (SR, BSR) | Meaning |
|---|---|
| No feedback (no UE transmission) | No data for transmission |
| 00 | New data (not high priority data), and BSR < threshold value |
| 01 | New data (not high priority data), and BSR > threshold value |
| 10 | New high priority data, and BSR < threshold value |
| 11 | New high priority data, and BSR < threshold value |

Thus, in this example, the UE only transmits an SR=1 value when there is new high priority data for uplink transmission in the UE buffer. The UE transmits an SR=0 when the UE has data in the buffer but it is not high priority. The BSR value indicates whether the amount of data is greater than or less than a threshold value (e.g., in bits).

Examples of Multiple Symbol PUCCH Transmissions

Certain aspects are directed to transmitting an SR and BSR using a multi-symbol PUCCH (e.g., PUCCH format 1).

In some examples, the UE may assign a priority to the SR or the BSR, relative to the other. For example, if the SR relates to data that is not high priority (e.g., as in Table 2), then the BSR may be a higher priority than the SR. Conversely, if the SR is configured to indicate high priority data, then the SR may be a higher priority than the BSR. In this example, the SR/BSR that is of higher priority may be transmitted by the UE in a first-in-time symbol of the PUCCH, while the other of the SR/BSR is transmitted in a subsequent symbol of the PUCCH.

For example, if the SR is a higher priority, then the SR is transmitted using one or more a first-in-time symbol(s) of the PUCCH. A subsequent symbol of the PUCCH may be transmitted carrying the BSR, and in some examples, may also carry a repeat of the SR. If the BSR is higher priority, then the BSR may be transmitted using one or more first-in-time symbol(s) of the PUCCH. In this example, the UE may not need to transmit an SR because the transmission of a BSR implicitly indicates that the UE has information to transmit. Further, if the BSR has priority, the base station may determine that the uplink data is not high priority. It should be noted that the symbols of the PUCCH may be transmitted with a cyclic value that maps to the proper SR/BSR value.

Figure 9:
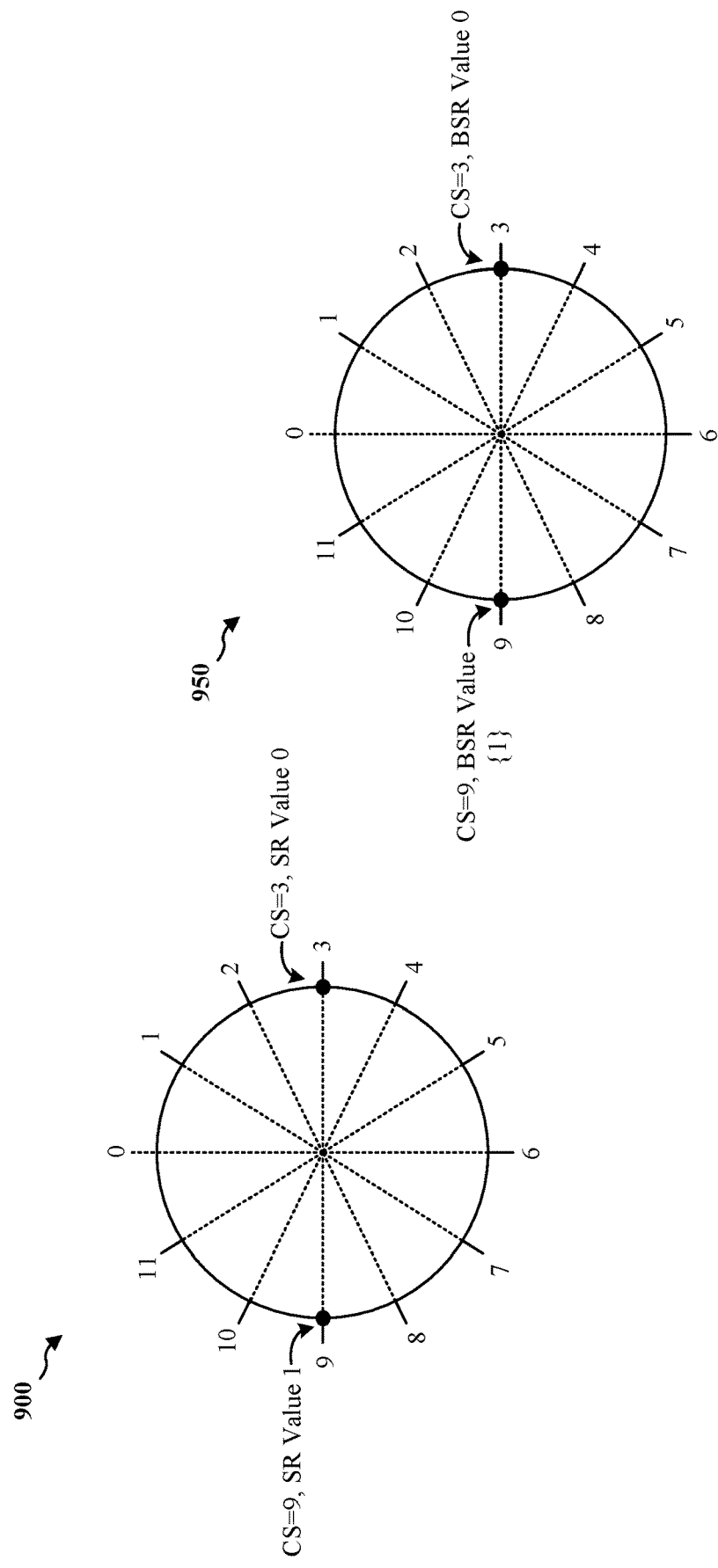
FIG. 9 is a schematic diagram illustrating an example mapping between and SR and BSR values and a cyclic shift value.

FIG. 9 is a schematic diagram illustrating an example mapping between and SR and BSR values and a cyclic shift value. As illustrated, a first symbol 900 may be transmitted using a cyclic shift to indicate an SR value, and a second symbol 950 may be transmitted using a cyclic shift to indicate a BSR value. A cyclic shift of 3 may indicate an SR value of 0 in the first symbol 900, and a BSR value of 0 in the second symbol 950. A cyclic shift of 9 may indicate an SR value of 1 in the first symbol 900, and a BSR value of 1 in the second symbol 950. It should be noted that any cyclic shift value may be mapped to the SR and BSR values.

Here, the first symbol 900 of the PUCCH may be used to indicate the SR value, and the second symbol 950 of the PUCCH may be used to indicate the BSR value. The same cyclic shift mapping may be used for both SR and BSR (e.g., value 0 maps to the same cyclic shift, and value 1 maps to another cyclic shift), or the mapping may be different for SR and BSR. For example, cyclic shift values {3, 9} may correspond to SR values, while cyclic shift values {0, 6} may correspond to BSR values.

Figure 10:
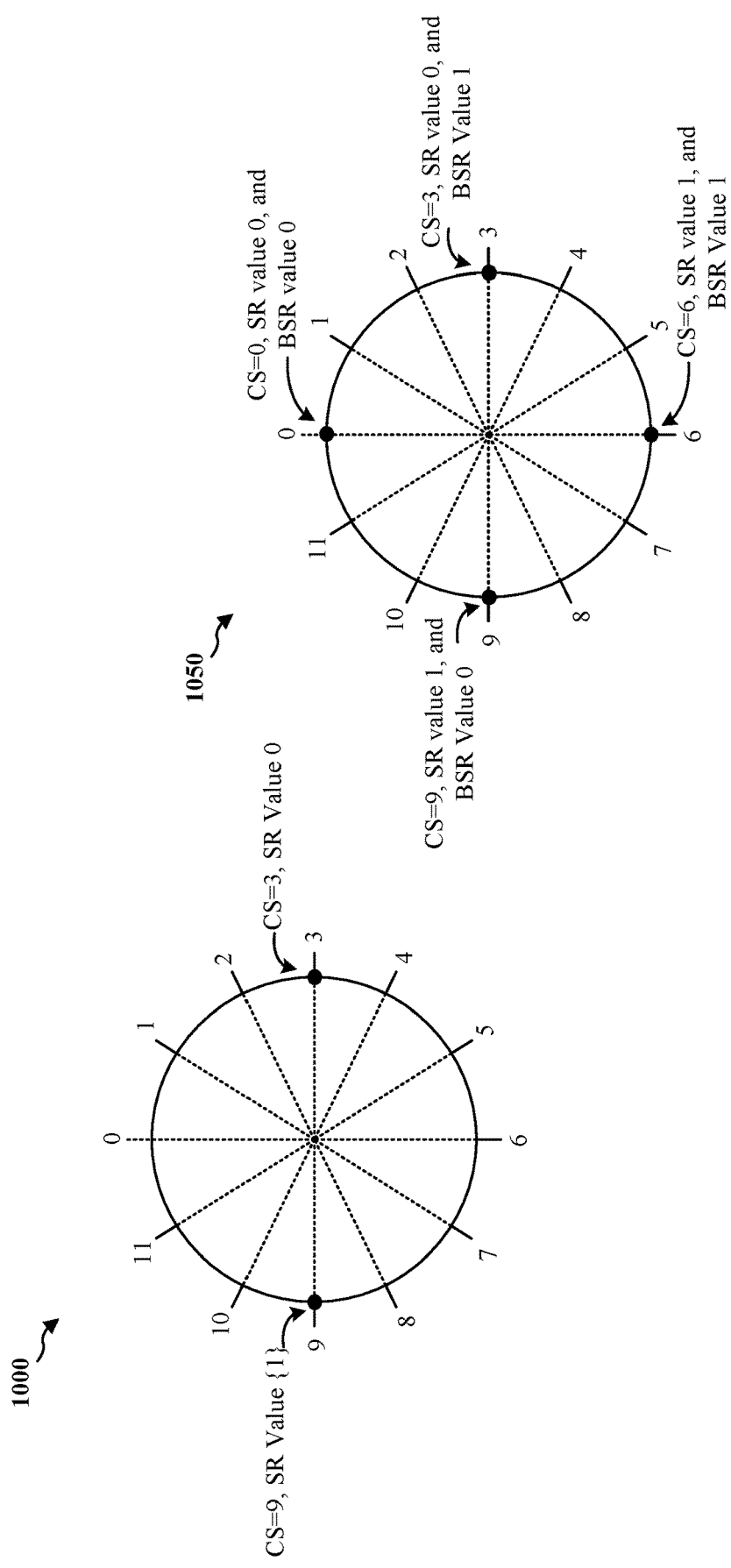
FIG. 10 is a schematic diagram illustrating an example mapping between and SR and BSR values and a cyclic shift value.

FIG. 10 is a schematic diagram illustrating an example mapping between and SR and BSR values and a cyclic shift value. As illustrated, a first mapping 1000 may be used in a first symbol transmitted using a cyclic shift to indicate an SR value, and a second mapping 1050 may be used in a second symbol may be transmitted using a cyclic shift to indicate both the SR value and a BSR value. Here, the SR value may be a higher priority than the BSR value as discussed above. It should be noted that any cyclic shift value may be mapped to the SR and BSR values. In this example, there is equal distance between the cyclic shift values that are mapped to the SR and BSR values.

Figure 11:
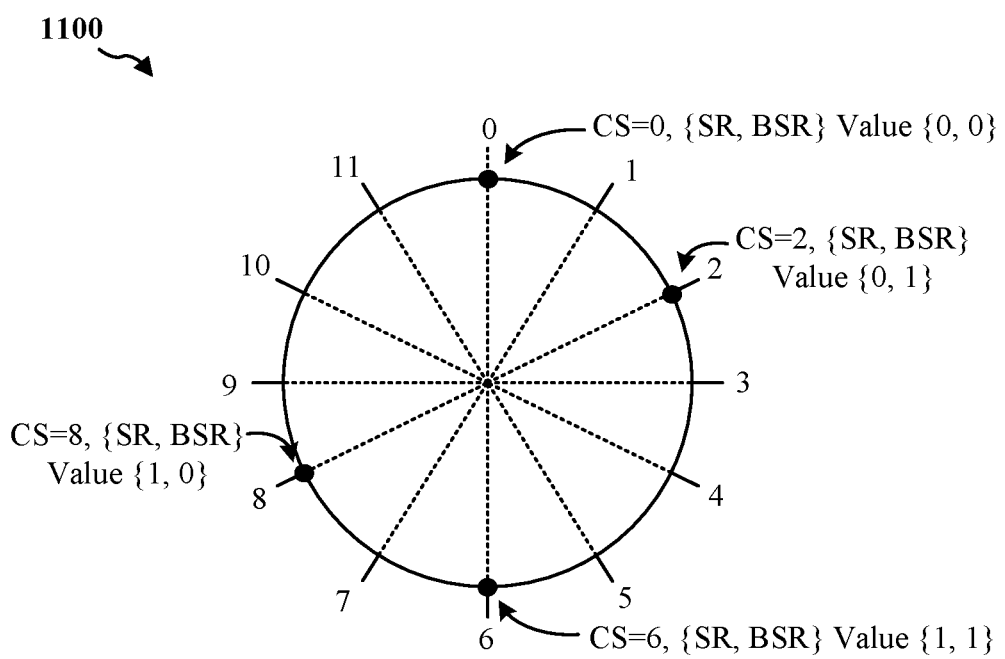
FIG. 11 is a schematic diagram illustrating an example mapping between and SR and BSR values and a cyclic shift value.

FIG. 11 is a schematic diagram illustrating an example mapping 1100 between and SR and BSR values and a cyclic shift value. The illustrated mapping may be used for the second symbol of FIG. 10. Although cyclic shift values 0, 2, 6, and 8 are used in this example, other cyclic shift values may be used instead. For example, cyclic shift values 0, 4, 6, and 10.

In certain aspects, the UE may use a PUCCH format 2 for an uplink transmission indicating one or more of an SR and/or BSR. The UE may transmit more than 2-bits in one or more symbols using a PUCCH format 2. In an example where the number of resource blocks (RBs) is 1, the UE may multiplex a 1-bit SR and a 1-bit BSR on the PUCCH. The bits may be encoded on a resource element (RE) granularity or the two bits may be encoded jointly. In an example where the number of RB is greater than 1, the SR and BSR bits may be encoded on an RE or RB granularity, or jointly encoded. The UE may dedicate more REs/RBs for a higher priority bit (e.g., SR or BSR). For example, because a PUCCH format 2 can be used to transmit more than 2 bits, the UE may transmit a 1-bit SR and use the remaining bits for BSR.

In certain aspects, a PUCCH format 1 may be used to transmit a 1- or 2-bit payload using 4-14 OFDM symbols. For a given cell-specific sequence S (e.g., length 12), 1- or 2-bit payloads (b) may be transmitted, where the sequence S includes DMRS on even OFDM symbols, and where S includes modulated b on odd OFDM symbols. The UE may use BPSK modulation for b=1 bit payload and QPSK modulation for b=2 bit payload.

Figure 12:
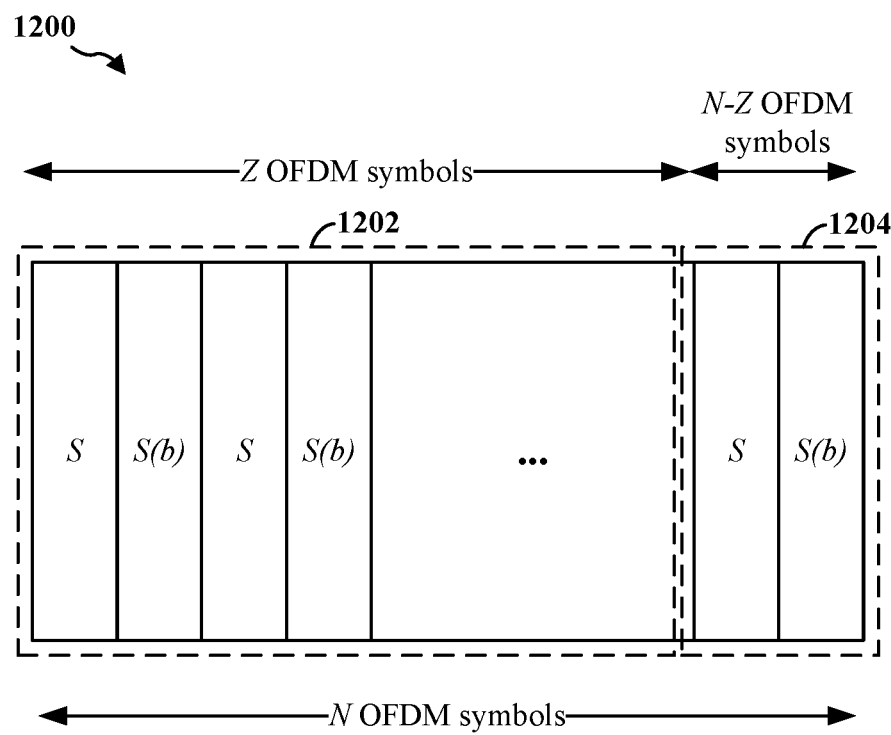
FIG. 12 is a block diagram illustrating an example PUCCH.

FIG. 12 is a block diagram illustrating an example PUCCH 1200 (e.g., format 1), wherein SR and BSR are multiplexed (e.g., time-domain multiplexed (TDM)) with the base sequence S. Here, the PUCCH 1200 may include multiple OFDM symbols (e.g., N=14 OFDM symbols), where the even numbered symbols are defined by S and odd numbered symbols are defined by S(b) (e.g., a product of multiplexing S with b). an SR 1202 may be indicated over the first Z symbols of the PUCCH 1200, and a combination of SR and BSR 1204 may be indicated over the last symbols (e.g., N-Z symbols).

Here, SR and BSR are TDM'd with the base sequence to indicate a value of the SR and BSR. The UE may use the first Z OFDM symbols to transmit a 1-bit high priority SR, while using the remaining N-Z OFDM symbols to transmit the SR and BSR. The value of Z may be configured by the base station and transmitted to the UE via RRC or DCI. In some examples, b may be equal to the SR value in the SR 1202, and b may be equal to the SR and BSR of the SR and BSR 1204.

Figure 13:
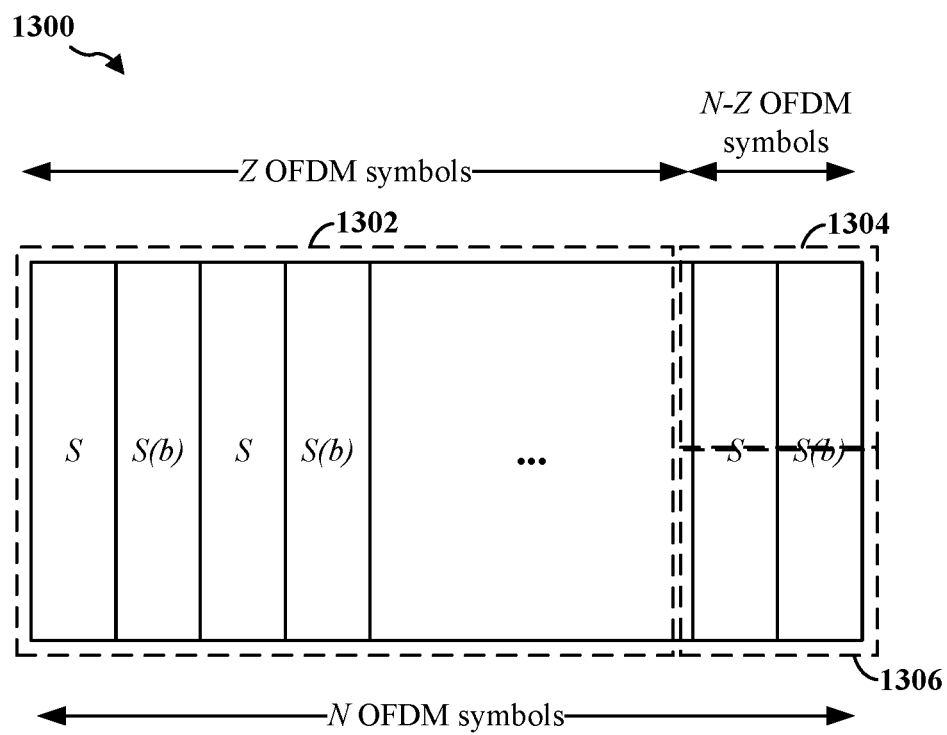
FIG. 13 is a block diagram illustrating an alternative example PUCCH.

FIG. 13 is a block diagram illustrating an alternative example PUCCH 1300 (e.g., format 1), wherein SR and BSR are multiplexed (e.g., time-domain multiplexed (TDM)) with the base sequence S. Here, the SR may be transmitted using a first portion 1302 of the PUCCH and a second portion 1304 of the PUCCH 1300, while the BSR is transmitted using a third portion 1306 of the PUCCH 1300. In some examples, the third portion may include a combination of SR and BSR.

Figure 14:
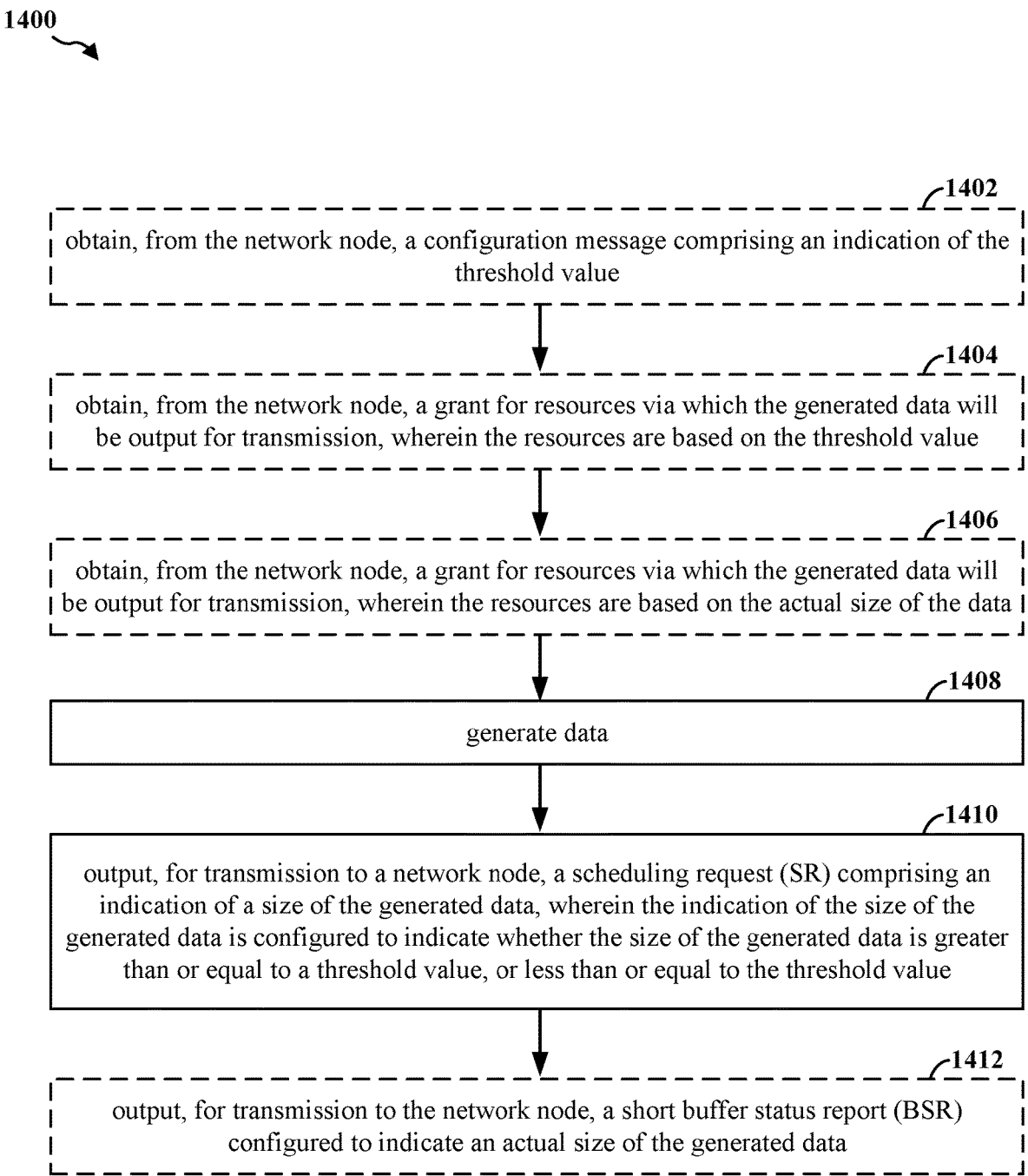
FIG. 14 is a flowchart of a method of wireless communication.

FIG. 14 is a flowchart 1400 of a method of wireless communication. The method may be performed by a UE (e.g., the UE 104; the apparatus 1502 of FIG. 15).

At 1402, the UE may obtain, from a network node, a configuration message comprising an indication of a threshold value. For example, 1402 may be performed by a receiving component 1540 of FIG. 15. For example, the threshold value may indicate a threshold buffer value that the UE may use to determine whether to indicate a 1 or a 0 to the network node to indicate its buffer status.

At 1404, the UE may obtain, from the network node, a grant for resources via which the generated data will be output for transmission, wherein the resources are based on the threshold value. For example, 1404 may be performed by the receiving component 1540 of FIG. 15. For example, the SR may indicate that the size of the generated data is less than or equal to the threshold value, indicating that the UE buffer contains a relatively low amount of data.

At 1406, the UE may obtain, from the network node, a grant for resources via which the generated data will be output for transmission, wherein the resources are based on the actual size of the data. For example, 1406 may be performed by the receiving component 1540 of FIG. 15. For example, the UE may provide the network node with an actual value of the BSR, for which the granted resources are provided.

At 1408, the UE may generate data. For example, 1408 may be performed by a generating component 1542 of FIG. 15. For example, the UE may generate data for an uplink transmission to the network node and store the generated data in a buffer.

At 1410, the UE may output, for transmission to a network node, a scheduling request (SR) comprising an indication of a size of the generated data, wherein the indication of the size of the generated data is configured to indicate whether the size of the generated data is greater than or equal to a threshold value, or less than or equal to the threshold value. For example, 1410 may be performed by a transmitting component 1544 of FIG. 15. For example, the UE may transmit an SR to the network node, wherein the SR is configured to indicate whether the generate uplink data is greater than or less than a threshold amount.

At 1412, the UE may output, for transmission to the network node, a short buffer status report (BSR) configured to indicate an actual size of the generated data. For example, 1412 may be performed by the transmitting component 1544 of FIG. 15. For example, the UE may generate data for an uplink transmission to the network node and store the generated data in a buffer.

In certain aspects, the SR is output for transmission in a first slot, and wherein the short BSR is output for transmission in a second slot subsequent to the first slot.

In certain aspects, the configuration message is obtained via a radio resource control (RRC) message, a medium access control (MAC) control element (MAC-CE), downlink control information (DCI), or a physical downlink shared channel (PDSCH).

In certain aspects, the indication of the size of the generated data is a 1-bit value.

In certain aspects, the indication of the size of the generated data comprises a first value indicated by a bit obtained based on the SR, and a second value indicated by a cyclic shift of the SR.

Figure 15:
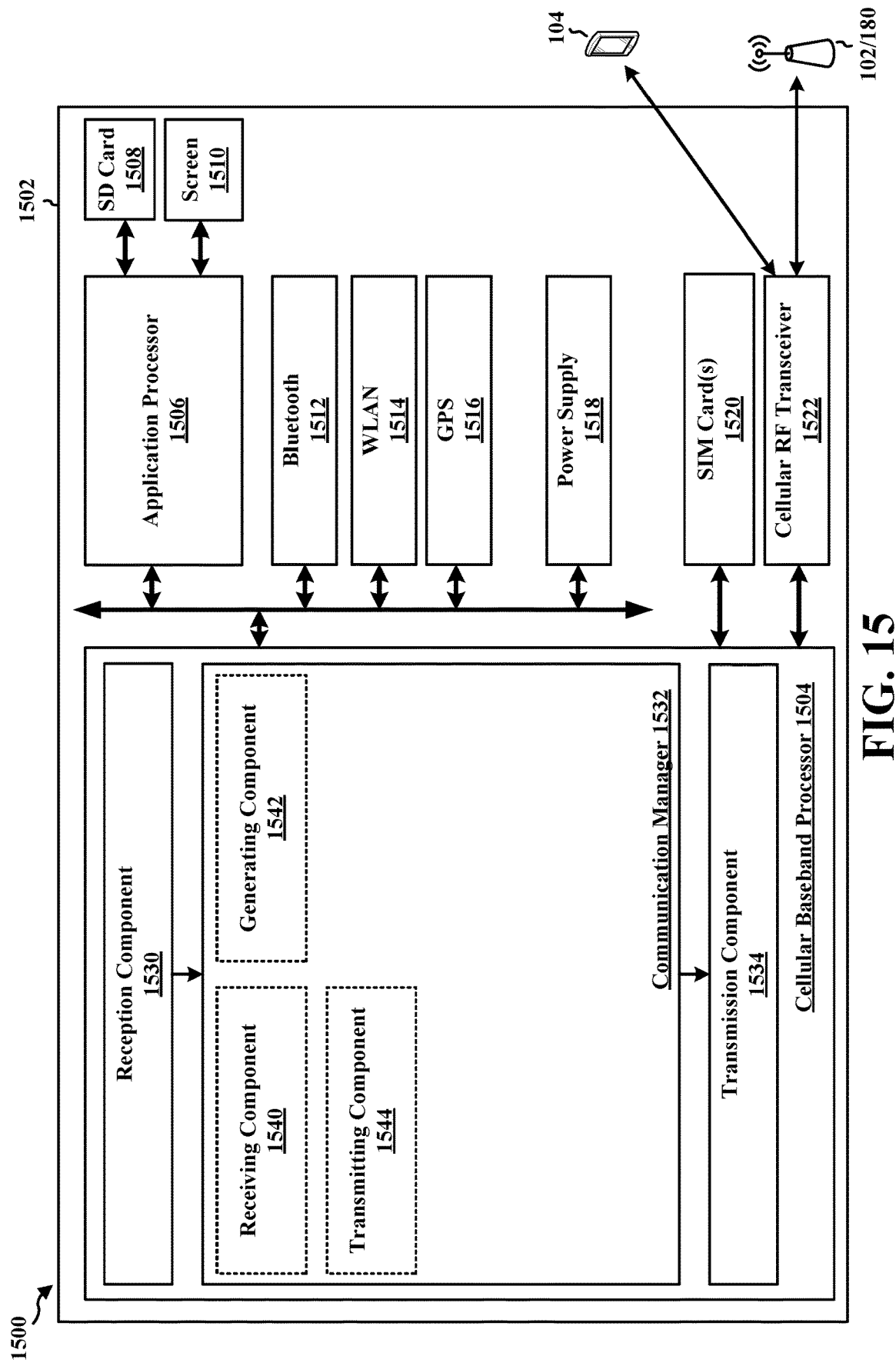
FIG. 15 is a diagram illustrating an example of a hardware implementation for an example apparatus.

FIG. 15 is a diagram 1500 illustrating an example of a hardware implementation for an apparatus 1502. The apparatus 1502 is a UE and includes a cellular baseband processor 1504 (also referred to as a modem) coupled to a cellular RF transceiver 1522 and one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 communicates through the cellular RF transceiver 1522 with the UE 104 and/or BS 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. The cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the aforediscussed additional modules of the apparatus 1502.

The communication manager 1532 includes a receiving component 1540 that is configured to obtain, from the network node, a grant for resources via which the generated data will be output for transmission, wherein the resources are based on the actual size of the data; obtain, from the network node, a grant for resources via which the generated data will be output for transmission, wherein the resources are based on the threshold value; and obtain, from the network node, a configuration message comprising an indication of the threshold value; e.g., as described in connection with 1402, 1404, and 1406 of FIG. 14.

The communication manager 1532 further includes a generating component 1542 configured to output, for transmission to a network node, a scheduling request (SR) comprising an indication of a size of the generated data, wherein the indication of the size of the generated data is configured to indicate whether the size of the generated data is greater than or equal to a threshold value, or less than or equal to the threshold value; and output, for transmission to the network node, a short buffer status report (BSR) configured to indicate an actual size of the generated data; e.g., as described in connection with 1410 and 1412 of FIG. 14.

The apparatus may include additional components that perform each of the blocks of the algorithm in the aforementioned flowchart of FIG. 14. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the cellular baseband processor 1504, includes means for obtaining, from the network node, a configuration message comprising an indication of the threshold value; means for obtaining, from the network node, a grant for resources via which the generated data will be output for transmission, wherein the resources are based on the threshold value; means for obtaining, from the network node, a grant for resources via which the generated data will be output for transmission, wherein the resources are based on the actual size of the data; means for generating data; means for outputting, for transmission to a network node, a scheduling request (SR) comprising an indication of a size of the generated data, wherein the indication of the size of the generated data is configured to indicate whether the size of the generated data is greater than or equal to a threshold value, or less than or equal to the threshold value; means for outputting, for transmission to the network node, a short buffer status report (BSR) configured to indicate an actual size of the generated data.

The aforementioned means may be one or more of the aforementioned components of the apparatus 1502 configured to perform the functions recited by the aforementioned means. As described supra, the apparatus 1502 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
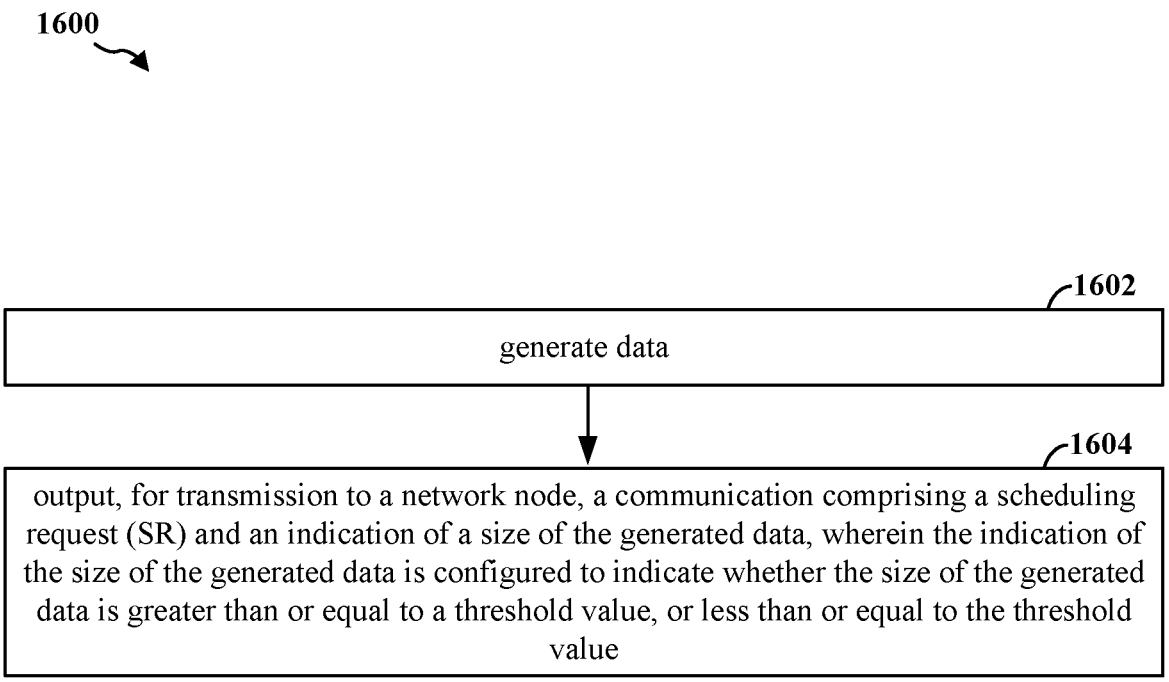
FIG. 16 is a flowchart of a method of wireless communication.

FIG. 16 is a flowchart 1600 of a method of wireless communication. The method may be performed by a UE (e.g., the UE 104; the apparatus 1602).

At 1602, the UE may generate data. For example, 902 may be performed by a generating component 1740. Here, the UE may generate data for an uplink transmission to a network node and store the generated data in a buffer.

At 1604, the UE may output, for transmission to a network node, a communication comprising a scheduling request (SR) and an indication of a size of the generated data, wherein the indication of the size of the generated data is configured to indicate whether the size of the generated data is greater than or equal to a threshold value, or less than or equal to the threshold value. For example, 1604 may be performed by transmitting component 1742.

In certain aspects, both the SR and the indication of the size are indicated via a cyclic shift of the communication.

In certain aspects, the cyclic shift is mapped to a value comprising a first bit and a second bit, wherein the first bit corresponds to the SR, and wherein the second bit corresponds to the indication of the size.

In certain aspects, the communication is a base sequence being output for transmission to the network node on a physical uplink control channel.

In certain aspects, the SR is a bit value configured to indicate that the generated data is stored in a buffer, and whether the generated data includes high priority data.

In certain aspects, the SR is output for transmission via a first symbol, wherein the indication of the size of the generated data is output for transmission via a second symbol, and wherein the first symbol is prior in time relative to the second symbol if the generated data includes high priority data.

In certain aspects, the communication is a physical uplink control channel (PUCCH).

Figure 17:
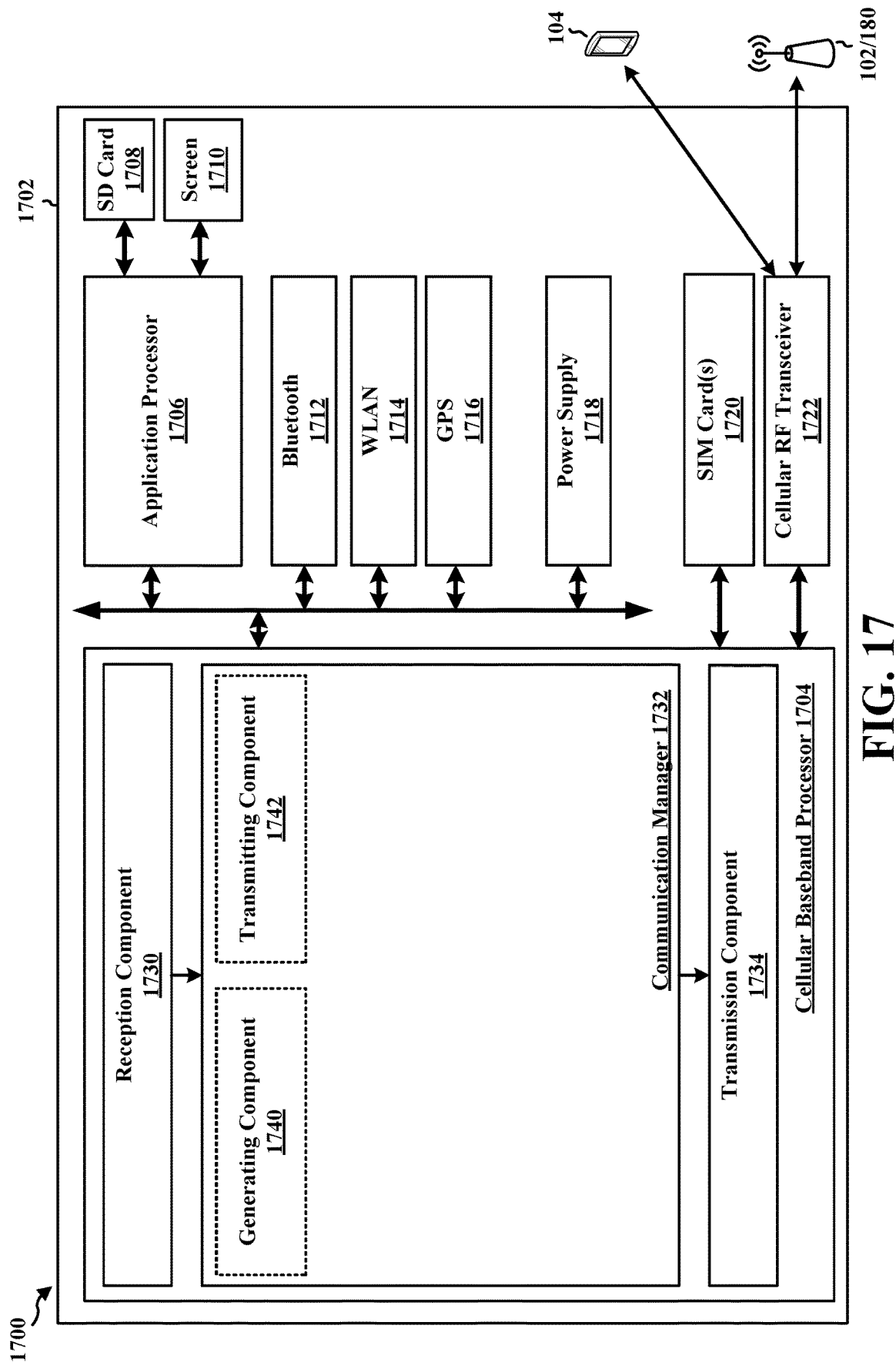
FIG. 17 is a diagram illustrating another example of a hardware implementation for an example apparatus.

FIG. 17 is a diagram 1700 illustrating an example of a hardware implementation for an apparatus 1702. The apparatus 1702 is a UE and includes a cellular baseband processor 1704 (also referred to as a modem) coupled to a cellular RF transceiver 1722 and one or more subscriber identity modules (SIM) cards 1720, an application processor 1706 coupled to a secure digital (SD) card 1708 and a screen 1710, a Bluetooth module 1712, a wireless local area network (WLAN) module 1714, a Global Positioning System (GPS) module 1716, and a power supply 1718. The cellular baseband processor 1704 communicates through the cellular RF transceiver 1722 with the UE 104 and/or BS 102/180. The cellular baseband processor 1704 may include a computer-readable medium/memory. The computer-readable medium/memory may be non-transitory. The cellular baseband processor 1704 is responsible for general processing, including the execution of software stored on the computer-readable medium/memory. The software, when executed by the cellular baseband processor 1704, causes the cellular baseband processor 1704 to perform the various functions described supra. The computer-readable medium/memory may also be used for storing data that is manipulated by the cellular baseband processor 1704 when executing software. The cellular baseband processor 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the cellular baseband processor 1704. The cellular baseband processor 1704 may be a component of the UE 350 and may include the memory 360 and/or at least one of the TX processor 368, the RX processor 356, and the controller/processor 359. In one configuration, the apparatus 1702 may be a modem chip and include just the baseband processor 1704, and in another configuration, the apparatus 1702 may be the entire UE (e.g., see 350 of FIG. 3) and include the aforediscussed additional modules of the apparatus 1702.

The communication manager 1732 includes a generating component 1740 that is configured to generate data, e.g., as described in connection with 1602 of FIG. 16. The communication manager 1732 further includes a transmitting component 1742 configured to output, for transmission to a network node, a communication comprising a scheduling request (SR) and an indication of a size of the generated data, wherein the indication of the size of the generated data is configured to indicate whether the size of the generated data is greater than or equal to a threshold value, or less than or equal to the threshold value, e.g., as described in connection with 1604.

The apparatus may include additional components that perform each of the blocks of the algorithm in the aforementioned flowchart of FIG. 16. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the cellular baseband processor 1704, includes means for generating data, and means for outputting, for transmission to a network node, a communication comprising a scheduling request (SR) and an indication of a size of the generated data, wherein the indication of the size of the generated data is configured to indicate whether the size of the generated data is greater than or equal to a threshold value, or less than or equal to the threshold value.

The aforementioned means may be one or more of the aforementioned components of the apparatus 1702 configured to perform the functions recited by the aforementioned means. As described supra, the apparatus 1702 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Additional Considerations

Means for receiving or means for obtaining may include a receiver (such as the receive processor 338) or an antenna (s) 352 of the UE 350 or the receive processor 356. Means for transmitting or means for outputting for transmission may include a transmitter (such as the transmit processor 368) or an antenna(s) 352 of the UE 350 illustrated in FIG. 3. Means for generating may include a processing system, which may include one or more processors, such as the receive processor 356, the transmit processor 368, the TX MIMO processor 354, and/or the controller 359 of the UE 350 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "generating" (or any variants thereof such as "generate") encompass a wide variety of actions. For example, "generating" may include calculating, computing, processing, deriving, investigating, looking up (e.g., looking up in a table, a database or another data structure), ascertaining and the like.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method for wireless communication at an apparatus, comprising: generating data; and outputting, for transmission to a network node, a scheduling request (SR) comprising an indication of a size of the generated data, wherein the indication of the size of the generated data is configured to indicate whether the size of the generated data is greater than or equal to a threshold value, or less than or equal to the threshold value.

Example 2 is the method of example 1, wherein the SR indicates that the size of the generated data is greater than or equal to the threshold value, and wherein the method further comprises: outputting, for transmission to the network node, a short buffer status report (BSR) configured to indicate an actual size of the generated data.

Example 3 is the method of example 2, wherein the SR is output for transmission in a first slot, and wherein the short BSR is output for transmission in a second slot subsequent to the first slot.

Example 4 is the method of any of examples 2 and 3, wherein the method further comprises: obtaining, from the network node, a grant for resources via which the generated data will be output for transmission, wherein the resources are based on the actual size of the data.

Example 5 is the method of any of examples 1-4, wherein the SR indicates that the size of the generated data is less than or equal to the threshold value, and wherein the method further comprises: obtaining, from the network node, a grant for resources via which the generated data will be output for transmission, wherein the resources are based on the threshold value.

Example 6 is the method of any of examples 1-5, wherein the method further comprises: obtaining, from the network node, a configuration message comprising an indication of the threshold value.

Example 7 is the method of example 6, wherein the configuration message is obtained via a radio resource control (RRC) message, a medium access control (MAC) control element (MAC-CE), downlink control information (DCI), or a physical downlink shared channel (PDSCH).

Example 8 is the method of any of examples 1-7, wherein the indication of the size of the generated data is a 1-bit value.

Example 9 is the method of any of examples 1-8, wherein the indication of the size of the generated data comprises a first value indicated by a bit obtained based on the SR, and a second value indicated by a cyclic shift of the SR.

Example 10 is a method for wireless communication at an apparatus, comprising: generating data; and outputting, for transmission to a network node, a communication comprising a scheduling request (SR) and an indication of a size of the generated data, wherein the indication of the size of the generated data is configured to indicate whether the size of the generated data is greater than or equal to a threshold value, or less than or equal to the threshold value.

Example 11 is the method of example 10, wherein both the SR and the indication of the size are indicated via a cyclic shift of the communication.

Example 12 is the method of example 11, wherein the cyclic shift is mapped to a value comprising a first bit and a second bit, wherein the first bit corresponds to the SR, and wherein the second bit corresponds to the indication of the size.

Example 13 is the method of any of examples 10-12, wherein the communication is a base sequence being output for transmission to the network node on a physical uplink control channel.

Example 14 is the method of any of examples 10-13, wherein the SR is a bit value configured to indicate that the generated data is stored in a buffer, and whether the generated data includes high priority data.

Example 15 is the method of any of examples 10-14, wherein the SR is output for transmission via a first symbol, wherein the indication of the size of the generated data is output for transmission via a second symbol, and wherein the first symbol is prior in time relative to the second symbol if the generated data includes high priority data.

Example 16 is the method of any of examples 10-15, wherein the communication is a physical uplink control channel (PUCCH).

Example 17 is a UE, comprising: a transceiver; a memory comprising instructions; and one or more processors configured to execute the instructions to cause the UE to perform a method in accordance with any one of examples 1-9, wherein the transceiver is configured to: transmit the SR.

Example 18 is a UE, comprising: a transceiver; a memory comprising instructions; and one or more processors configured to execute the instructions to cause the UE to perform a method in accordance with any one of examples 10-16, wherein the transceiver is configured to: transmit the communication comprising the SR and the indication of the size of the generated data.

Example 19 is an apparatus for wireless communications, comprising means for performing a method in accordance with any one of examples 1-9.

Example 20 is an apparatus for wireless communications, comprising means for performing a method in accordance with any one of examples 10-16.

Example 21 is a non-transitory computer-readable medium comprising instructions that, when executed by an apparatus, cause the apparatus to perform a method in accordance with any one of examples 1-9.

Example 22 is a non-transitory computer-readable medium comprising instructions that, when executed by an apparatus, cause the apparatus to perform a method in accordance with any one of examples 10-16.

Example 23 is an apparatus for wireless communications, comprising: a memory comprising instructions; and one or more processors configured to execute the instructions to cause the apparatus to perform a method in accordance with any one of examples 1-9.

Example 24 is apparatus for wireless communications, comprising: a memory comprising instructions; and one or more processors configured to execute the instructions to cause the apparatus to perform a method in accordance with any one of examples 10-16.

What is claimed is:

1. An apparatus configured for wireless communication, comprising:
    at least one memory comprising instructions; and
    one or more processors configured to execute the instructions to cause the apparatus to:
        generate data;
        output, for transmission to a network node, a scheduling request (SR) comprising an indication of a size of the generated data, wherein the indication of the size of the generated data is configured to indicate whether the size of the generated data is greater than or equal to a threshold value, or less than the threshold value;
        when the SR indicates that the size of the generated data is greater than or equal to the threshold value, output, for transmission to the network node, a short buffer status report (BSR) configured to indicate an actual size of the generated data; and
        when the SR indicates that the size of the generated data is less than the threshold value, refrain from outputting the short BSR.

2. The apparatus of claim 1, wherein the SR is output for transmission in a first slot, and wherein the short BSR is output for transmission in a second slot subsequent to the first slot.

3. The apparatus of claim 1, wherein the one or more processors are further configured to cause the apparatus to:
    when the SR indicates that the size of the generated data is greater than or equal to the threshold value, obtain, from the network node, a grant for resources via which the generated data will be output for transmission, wherein the resources are based on the actual size of the data; and
    when the SR indicates that the size of the generated data is less than the threshold value, obtain, from the network node, the grant for resources, wherein the resources are based on the threshold value.

4. The apparatus of claim 1, wherein the one or more processors are further configured to cause the apparatus to:
    obtain, from the network node, a configuration message comprising an indication of the threshold value.

5. The apparatus of claim 4, wherein the configuration message is obtained via a radio resource control (RRC) message, a medium access control (MAC) control element (MAC-CE), downlink control information (DCI), or a physical downlink shared channel (PDSCH).

6. The apparatus of claim 1, wherein the indication of the size of the generated data is a 1-bit value.

7. The apparatus of claim 1, wherein the indication of the size of the generated data comprises a first value indicated by a bit obtained based on the SR, and a second value indicated by a cyclic shift of the SR.

8. A user equipment (UE), comprising:
    at least one transceiver;
    at least one memory comprising instructions; and
    one or more processors configured to execute the instructions to cause the UE to:
        generate data;
        transmit, via the at least one transceiver, a scheduling request (SR) comprising an indication of a size of the generated data, wherein the indication of the size of the generated data is configured to indicate whether the size of the generated data is greater than or equal to a threshold value, or less than the threshold value;
        when the SR indicates that the size of the generated data is greater than or equal to the threshold value, transmit, via the at least one transceiver, a short buffer status report (BSR) configured to indicate an actual size of the generated data; and
        when the SR indicates that the size of the generated data is less than the threshold value, refrain from transmitting the short BSR.

9. A method for wireless communications at a first wireless node, comprising:
    generating data;
    outputting, for transmission to a second wireless node, a scheduling request (SR) comprising an indication of a size of the generated data, wherein the indication of the size of the generated data is configured to indicate whether the size of the generated data is greater than or equal to a threshold value, or less than the threshold value;
    when the SR indicates that the size of the generated data is greater than or equal to the threshold value, outputting, for transmission to the second wireless node, a short buffer status report (BSR) configured to indicate an actual size of the generated data; and
    when the SR indicates that the size of the generated data is less than the threshold value, refraining from outputting the short BSR.

10. The method of claim 9, wherein the SR is transmitted in a first slot, and wherein the short BSR is transmitted in a second slot subsequent to the first slot.

11. The method of claim 9, further comprising:
    obtaining a grant for resources via which the generated data will be transmitted, wherein the resources are based on the actual size of the data.

12. The method of claim 9, further comprising:
    when the SR indicates that the size of the generated data is greater than or equal to the threshold value, obtaining a grant for resources via which the generated data will be output for transmission, wherein the resources are based on the threshold value; and when the SR indicates that the size of the generated data is less than the threshold value, obtaining the grant for resources, wherein the resources are based on the threshold value.

13. The method of claim 9, further comprising:

obtaining a configuration message comprising an indication of the threshold value.

14. The method of claim 13, wherein the configuration message is received via a radio resource control (RRC) message, a medium access control (MAC) control element (MAC-CE), downlink control information (DCI), or a physical downlink shared channel (PDSCH).

15. The method of claim 9, wherein the indication of the size of the generated data is a 1-bit value.

16. The method of claim 9, wherein the indication of the size of the generated data comprises a first value indicated by a bit obtained based on the SR, and a second value indicated by a cyclic shift of the SR.

* * * * *